United States Patent [19]
Tominaga

[11] 3,867,857
[45] Feb. 25, 1975

[54] MATERIAL CUTTING DEVICE

[75] Inventor: Hiroshi Tominaga, Yokohama, Japan

[73] Assignee: Tokyu Sharyo Seizo Kabushiki Kaisha, Kanagawa-ken, Japan

[22] Filed: Nov. 30, 1973

[21] Appl. No.: 420,733

[52] U.S. Cl............ 83/9, 83/14, 83/375, 83/456, 83/461, 83/622, 83/639
[51] Int. Cl........................ B23d 15/04, B23d 15/14
[58] Field of Search............ 83/9, 14, 19, 375, 456, 83/461, 622, 639

[56] References Cited
UNITED STATES PATENTS

| | | | |
|---|---|---|---|
| 3,252,364 | 5/1966 | Veres et al. | 83/14 |
| 3,590,674 | 7/1971 | Maeda | 83/14 |

*Primary Examiner*—Frank T. Yost
*Attorney, Agent, or Firm*—Blum, Moscovitz, Friedman & Kaplan

[57] ABSTRACT

A material cutting device especially suited to effect an improved shearing of a workpiece is provided. A holding mechanism is provided for securing a workpiece proximate a working tool to be radially sheared thereby. A compression mechanism is coaxially disposed with respect to the secured workpiece and is adapted to effect an axial compression of the workpiece coincident with the shearing of the workpiece by the cutting tool to effect a superior cutting of the workpiece. The holding mechanism includes projections disposed for biting into the workpiece during securing of same to facilitate the subsequent cutting thereof.

10 Claims, 5 Drawing Figures

MATERIAL CUTTING DEVICE

BACKGROUND OF THE INVENTION

This invention relates in general to a device for instantaneously cutting a metal bar or the like material at high speed and in particular to a device for cutting a metal bar or like material by shearing same in a radial direction, while repeatedly applying a compression or tension force to the workpiece to effect a compound stress thereon, to facilitate the high speed cutting thereof.

Heretofore, when cutting a material by a shearing method, the common practice has been to place the material in a static state and then to effect a plastic deformation using a shearing force determined by the yield point, sectional area and other related factors of the material. Accordingly, the shearing force required for producing such plastic deformations is extremely large, the actual force varying in accordance with the quality, size and other properties of the material to be cut, thus posing difficulties in obtaining a smooth and flat cut plane.

It has been recognized that the required amount of cutting force necessary to effect such a shearing can be greatly diminished by repetitively applying a compression and/or tension force to the material in its axial direction during the cutting operation to thereby develop high compound stress within said material to lower the yield point thereof, thereby facilitating the plastic deformation of the material. Moreover, under such axial force, if the cutting speed is increased beyond a certain level, the material to be cut under such conditions becomes fragile to thereby facilitate shearing thereof, and further provide a smooth and flat cut plane.

Furthermore, when shearing material, the resistance encountered in a cutting tool sharply increases as the tool bites into the material. This can cause cracks to develop in the material due to the cutting end of the tool, such cracks progressively worsening as the tool advances during cutting. Such cracks are also likely to develop in the sheared plane, and the cut section may become dull and/or burrs may form thereon. Such dullness or burrs may distort the original shape of the cutting plane thus making uniform dimensions and weights unobtainable. It has therefore been difficult to obtain products which are smooth and uniform at their cut planes and have no cracks in the surface by utilization of the prior art cutting devices.

SUMMARY OF THE INVENTION

Generally speaking, in accordance with the invention, a material cutting device is provided and includes several stepped piston hammers coaxially disposed with respect to the material to be cut, each said hammer being disposed in end-to-end relation with a suitable space therebetween, each of said hammers being mounted such that the stepped portion thereof is slidably fitted in a large-diameter cylindrical cavity formed in a cylinder. The small-diameter portions of the hammers on both sides of each said stepped portion are slidably engaged in a guide hole of smaller diameter also formed in said cylinder. A space on the material side of the large-diameter cylindrical cavity in said cylinder is coupled to an air pipe which can be switched either to a compressed air source or to the ambient air. The space on the other side of said piston is in fluid communication with a liquid pressure source through a water channel. The liquid pressure source is also coupled to the cutting device in order to drive same simultaneously with the piston hammers. The invention is further characterized in that a slidable cutter assembly and a fixed receiving block are disposed in proper opposed relation to constitute a material or workpiece cutting mechanism. A slidable presser element is disposed adjacent to said cutting mechanism and in opposition to the material receiving block to constitute a material holder mechanism, said holder mechanism being provided with bite-in projections adapted to form notches along the length of the workpiece at intervals corresponding to desired lengths of the cut workpieces. Accordingly, a workpiece is securely held by said holder mechanism so that the projections bite into the workpiece and the workpiece is sheared at high speeds by the cutter of said cutting mechanism through other previously formed notches as a compressive force is applied in the axial direction of the workpiece. Thus high speed shearing of the material is effected under a compound stress by successively percussing the material by displacing the stepped piston hammers end-to-end at suitably selected time intervals, and repeating such cycle of percussions several times.

Furthermore, in accordance with the instant invention, the projections have a predetermined configuration and are disposed at intervals from the cutting edge of the cutter equal to the length of the workpiece to be cut and are adapted to circumferentially bite into the workpiece when such workpiece is held in position for cutting. The biting effects a reduction in cutting area of the workpiece and also reinforces the axial holding force against the compressive force exerted against the workpiece in its axial direction, hence allowing the compound stress to be fully applied to thereby allow high speed shearing operation to obtain a smooth and flat cut plane with no dullness, burrs or cracks.

Accordingly it is an object of the instant invention to provide an improved high speed cutting device wherein high-speed cutting is effected by applying a compressive force to the material to be cut.

Another object of the instant invention is to provide an improved high speed cutting device which facilitates and improves the cutting of materials to eliminate dullness and cracks in the cut surface.

It is still another object of the instant invention to provide an improved cutting device wherein the individual materials can be uniformly cut into units of the same weight and dimensions.

It is still a further object of the instant invention to provide a cutting mechanism which effects a minimum distortion of the material and is further capable of working the material into a finished blank.

DETAILED DESCRIPTION OF THE DRAWINGS

Figure 1:
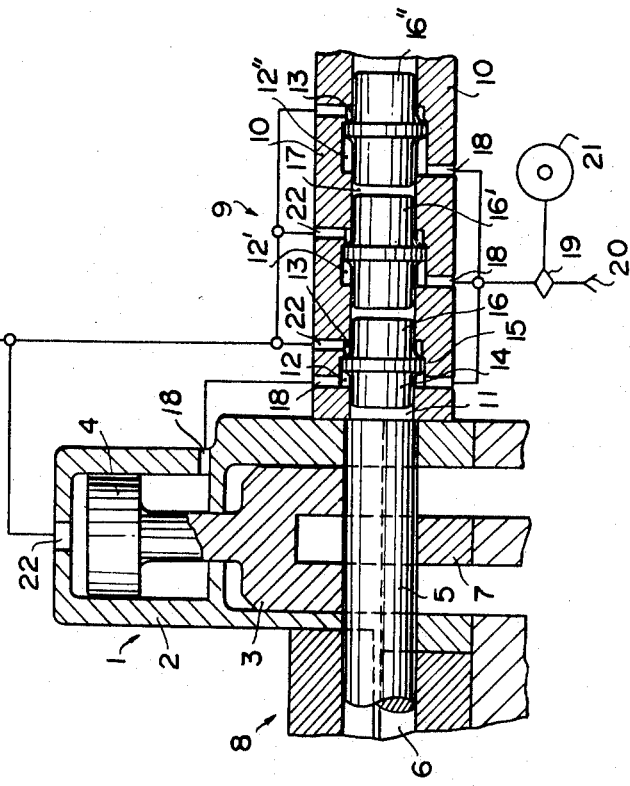
FIG. 1 is a sectional view of a cutting mechanism constructed in accordance with a preferred embodiment of the instant invention.

Reference is made to FIG. 1, wherein a forked movable tool 3 is mounted in the upper part of a body 2 of a cutting mechanism, generally indicated at 1, and is adapted to provide a four point cutting in manner to be hereinafter described. The tool 3 is integrally joined to a piston 4 so that the tool 3 is displaced in an upward and downward direction by the movement of said piston 4. A fixed tool 7 is suitably spaced from said movable tool 3 so that the material or workpiece 5 can pass therebetween. A holding mechanism is generally indicated at 8 and is provided with a passage 6 in which material or workpiece 5 is passed. The fixed tool 7 is arranged to interfit with movable tool 3. Holding mechanism 8 is adapted to clamp the workpiece 5 on a first side of such cutting mechanism in the cylindrical passage 6 as is depicted. On the other side of said cutting mechanism there is disposed a percussion exerting mechanism generally indicated at 9, which includes a block 10 mounted to said body portion 2. Block 10 is formed with a cylindrical guide hole 11 coaxially aligned with the space 6 but slightly smaller in diameter than passage 6 so as to be adapted to locate a first end of the workpiece 5. The guide hole 11 of block 10 defines three coaxial large diameter cylinders, 12, 12', 12", each cylinder having a successively larger axial dimension when viewed from left to right on FIG. 1 to successively provide a three-fold percussion force. Each cylinder has formed adjacent thereto and in communication therewith an annular cavity 13 disposed on the side of said cylinder which is furthest from said working tool 3.

The guide hole 11 formed in block 10 has slidably disposed in cylinders 12, 12' and 12", stepped piston hammers 16, 16' and 16", respectively, each said piston having a hammer portion 14 and a piston portion 15. Each piston hammer is arranged in relation to block 10 such that when the piston 15 of each piston hammer 16, 16', 16" is moved to the right as viewed in FIG. 1, equal spaces 17 occur between the workpiece 5 and the face of hammer portion 14 and between each of the piston hammer 16, 16' and 16". Because the axial length of each of the respective large-diameter cylinders 12, 12', 12" is selected so that the forward movement of the first stepped piston hammer 16 will be at least equal in distance to the length of space 17, the forward movement by the second stepped piston hammer 16' will be equal to at least double the length of space 17, and the displacement of the third stepped piston hammer 16" will be equal to at least three times the distance of space 17.

Pneumatic pressure passages 18 are formed in the body portion 2 of cutting mechanism 1 at a position below the piston 4 and also at those parts of the block 10 of said percussion mechanism 9 which are at the lead end of the respective large-diameter cylinders 12, 12', 12". The pneumatic pressure passages 18 communicate with each other and may be vented to ambient air by connection to opening 20, through a change-over valve 19. Valve 19 can also connect passages 18 to a compressed air source 21. Liquid pressure passages 22 are formed in body portion 2 above the piston 4 and in block 10 at the after end of each small diameter annular cavity 13, each of said liquid pressure passages 22 being connected to an impact liquid pressure source 23.

Figure 2:
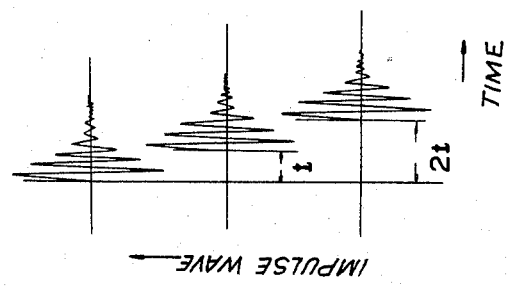
FIG. 2 is a graphical representation of timing relationship of the compression pistons illustrated in FIG. 1.

In operation, the ambient air opening 20 is closed and pneumatic pressure is effected through passages 18 in each of the large-diameter cylinders by the compressed air source 21 to thereby cause the respective stepped piston hammers 16, 16', 16" to be displaced to a withdrawn position. Pneumatic pressure is also effected in the body portion 2 to cause the movable tool 3 to be raised with the piston 4. A workpiece 5 is then inserted into the space 6 above the fixed tool 7 and fixed by holding means 8. Thereafter, the change-over valve 19 is actuated to vent cylinder 12, 12', 12" and the underside of piston 4 and, at the same time, effect an impact liquid pressure in each of the annular cavities 13 through passage 22 by impact liquid pressure source 23 to let the respective stepped piston hammers 16, 16', 16" move forwardly together at a speed of, for example, 10 m/s. For purposes of illustration the interval $t$ depicted in FIG. 2 is set at $10^{-3}$ sec., and the workpiece 5 is subjected to three consecutive percussions in the axial direction by the first stepped piston hammer 16, while impact liquid pressure enters body portion 2 to drive down the movable tool by effecting displacement of piston 4, to contact the workpiece and thereby cut same into four pieces. It is understood that the present invention is not limited to the above-said number of pieces and that it is possible to cut a workpiece into any number of pieces.

Figure 3:
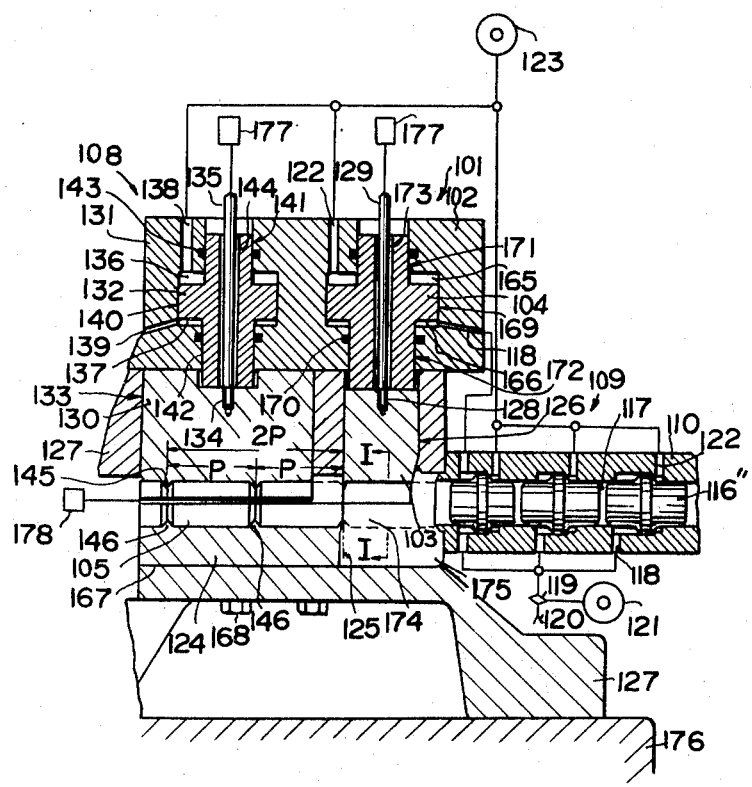
FIG. 3 is a sectional view of an alternative embodiment of a cutting mechanism constructed in accordance with the instant invention.

Reference is now made to FIG. 3 wherein another preferred embodiment of the present invention is depicted. A movable tool 103 is slidably disposed in a body portion 102 to serve as a movable cutter means. A fixed receiving block 124 is disposed in opposition to said movable tool 103 and is normal to the cutting plane of a workpiece 105 to thereby constitute a cutter assembly, generally indicated at 101, for achieving a shearing of the workpiece, the configuration thereof conforming to that of the workpiece to be cut. A presser member 130 is slidably arranged in a position adjacent to the body portion 102, and conforms to the in common side of receiving block 124, to constitute a material holder mechanism, generally indicated at 108. At the opposed faces of presser member 130 and receiving block 124 are disposed annular projectors 145 and 146 located at intervals along the length of the workpiece and away from the cutting edge in a manner to be hereinafter discussed. In performing the cutting, an external force is exerted by said presser member 130 to let the projection bite into the workpiece to thereby hold same in position while compressive force is applied to said workpiece in its axial direction as a high speed shearing is effected by movable tool 103.

Movable tool 103 is formed with a rectangular cross section and is adapted to slide in a guide hold 126 formed in the body portion adjacent cutting plane 125 to provide a sliding displacement normal to the axis of the workpiece 105. The tool is also positioned in opposition to the end of the receiving block 124 and is shaped to conform to the contour of the workpiece 105 to be cut. The receiving block 124 is secured to body portion 102 in such a manner that the fore end thereof forms a cutting edge provided with bite-in-projections 146 positioned at a distance P from said fore end portion and also at distances which are multiples of P, 2P, 3P, etc. The material presser 130 is of the same configuration as the receiving block 124 and includes annular projections 145 at positions corresponding to and in opposition to projections 146 on the receiving block 124.

Figure 5:
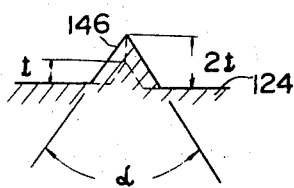
FIG. 5 is a sectional view of the projections formed in the holding member illustrated FIGS. 3 and 4.

The planar surfaces of presser 130 and receiving block 124 of the holder mechanism 108 are disposed in opposition to each other with a small space therebetween. The projections 145 and 146 have a specific relationship with respect to each other and, as depicted in FIG. 5, are positioned so that the projections closest to the movable tool 103 have a height of $2t$ while the other set of projections have a height of $t$, with each of the projections being inwardly projected and having an included angle $\alpha$ which approximates 90° in the instant embodiment, it being noted that such angle can vary and is not so limited.

The body portion 102 defines a sealed pressure-proof cylinder for containing water or other liquids. The body portion also contains a piston 104 slidably mounted in said cylinder, said piston being driven at a high speed by a suitable driving means such as an impact liquid pressure generating device which is adapted to provide an impact liquid pressure therein. The cutting mechanism 101 is comprised of a movable tool 103 adapted to act as a cutting tool for cutting the workpiece by co-ordinate operation of said piston 104, a material receiving block 124, and a material holding mechanism 108 which mechanism is adapted to hold by means of a compressive force the material inserted therein between movable tool 103 and receiving block 124.

The arrangement of movable tool 103 and receiving block 124 define upper and lower cutting edges separated across a plane parallel to the axial direction of the workpiece with their dimensions and configuration being selected to conform to the material to be cut thereby. The receiving block 124 is mounted to a base block 127, said receiving block being of such weight as to render same unmovable. The movable tool 103 is arranged to slide in the guide hole 126 formed in said base block 127. Movable tool 103 is also joined to operating bar 129 by fastening means 128 such as screws and the like and movement thereof is affected by displacement of the piston 104 in the cylindrical opening formed in body portion 102.

The impact liquid pressure chamber 165 is defined by percussion piston 104 and body portion 2 and is filled with water or other liquid and is in fluid communication through liquid pressure passage 122 to an impact liquid pressure generating means such as a hydropunch 123. On the side of the piston 104 remote from the impact liquid pressure chamber 165 is formed a pneumatic pressure chamber 166 which is in fluid communication through a pneumatic pressure passage 118 to the ambient air. These means constitute a fluid operating mechanism.

The material holding mechanism 108 including a presser element 130 for securing the workpiece by the application of a large force and a piston 132 specifically provided for holding the workpiece, the piston having a similar construction as the cutting mechanism 101 and juxtaposed adjacent thereto. The fluid operating mechanism 134 is further coupled to the percussion exerting mechanism, generally indicated at 9, to allow such mechanism to compress the working piece in its axial direction. Thus, the liquid pressure generating means 123 is coupled to cutting mechanism 101, holding mechanism 108 and percussion exerting mechanism 109 to effect a compressing and cutting of the workpiece.

Figure 4:
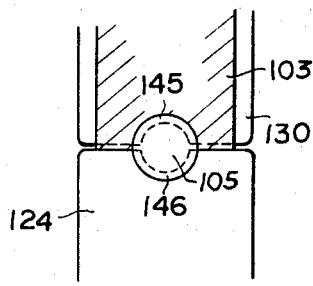
FIG. 4 is a sectional view taken along line I—I of FIG. 3.

The base block 127 has mounted thereon the operative components of the respective operating mechanisms, and in a preferred embodiment is of a heavy weight with respect to the operative mechanisms so as to render same unmovable during repeated percussions effected during the cutting operation. The receiving block 124 includes a lower cutter, defined by an end thereof forming a cutting edge, having an arc-shaped curvature or similar configuration with a radius similar to the material to be cut, as is illustrated in FIG. 4. The receiving block 124 is secured to the base block 127 by bolts 168 inserted through bottom grooves 167, the bolts being adapted to provide a proper spacing between the receiving block 124 and the movable tool 103.

The guide hole 126 formed in the movable tool 103 has a rectangular cross section in order to regulate the movement of movable tool 103 and to provide a planar surface to receive and absorb the lateral force produced in said movable tool 103 during the cutting operation. Movable tool 103 is so constructed that the surface thereof opposite to the receiving block 124 defines a cutting edge as is specifically shown in FIG. 4. The tool is driven in a reciprocating up and down direction by an air cylinder or a hydraulic cylinder 177 by effecting displacement of operating bar 129. Operating bar 129 is joined by screw member 128 to the movable tool 103 but it is preferable that such screw be provided with a large play so that it is shakey, to thereby inhibit the impact force exerted by the movable tool 103 to the operating bar 129 during direct propagation of the cutting tool to thereby effectively protect said bar against possible damage caused by the percussion forces.

Piston 104 consists of a large-diameter cylindrical portion and small-diameter upper and lower cylindrical portions on both sides of said larger portion. The large-diameter cylindrical portion is fitted in a large-diameter cylindrical guide hole 169 defined by the body portion 102, while the upper and lower small-diameter portions are disposed so as to be slidably engaged by upper guide 171 and a lower guide 172, respectively, the securing and sealing of such portion being effected by a conventional seal mean such as an O-ring gasket. The piston further includes a through hole 173 in its center to allow vertical movement of the operating bar 129 therethrough.

It is understood that air passage 118 can also be utilized to discharge leaked liquid when the liquid in the impact liquid pressure chamber 165 collected in the guide hole 169 leaks therefrom and flows into the pneumatic pressure chamber 166 therebelow.

As hereinabove described, the displacement of mechanism 108 is similar to the displacement of movable tool 103 in the cutting mechanism 101. However, the bottom 130' is either flat or shaped to conform to the contour of the workpiece and has no cutting edge. Elements 130 to 144 which constitute the material holding mechanism 108 are substantially identical to their counterparts in the cutting mechanism 101 except for a few minor differences in their purpose and construction, and any discussion thereof is unnecessary with the understanding that the liquid pressure passages 122 and 138 associated with these parts are all in communication with the same impact liquid pressure generating means that they are supplied with the same amount of liquid pressure as their counterparts but with a slight time lag relative to each other, such time lag being determined by the purpose or operation of the respective parts.

In operation the following occurs. Movable tool 103 in the cutting mechanism 101, presser member 130, piston hammers 116, 116', 116'' which operate in the same manner as their counterparts depicted in FIG. 1, are displaced by the action of pneumatic pressure exerted thereon by the compressed air source 121 through the respective pneumatic pressure passages 118. Also, operating bars 129 and 135 are displaced to a withdrawn position in their liquid pressure chambers 165 and 136, respectively, which chambers are partitioned into large-diameter cylindrical cavities, 112, 112', 112'', thereby providing an ample space for insertion of a workpiece. The workpiece is then fed into the space to a predetermined position by a workpiece feeder means 178 operated by an outside driving source (not shown), such that the length P of the workpiece to be cut is advanced to a position below cutting tool 103 with the recess previously formed by projection 146 lying in the cutting plane 125 of the movable tool 103, while the succeeding portion of the workpiece bitten by the earlier group of projections to a depth of $t$ advances to the position where a grooving to a depth of $2t$ is effected. Then, operative bars 129 and 135 are so operated by a hydraulic cylinder 177 to allow the movable tool 103 and presser member 130 to be displaced to a position where they lightly touch the end face of the workpiece. Thereafter, water is simultaneously supplied from any conventional water source such as tap into the impact liquid pressure chambers 165 and 136 through the respective liquid pressure passages 122 and 138 whereby pistons 104 and 132 are forced to be displaced toward and into contact with movable tool 103 and presser member 130, respectively.

When the water supply valve (not shown) is closed and the liquid pressure generated by an impact liquid pressure generating means such as hydro-punch is supplied to the impact liquid pressure chambers 165 and 136 and cylindrical bodies 113 through the respective passages 122 and 138, such liquid pressure causes the holding mechanism 108, impact exerting mechanism 109 and cutting mechanism 101 to become succesively operative with a slight time interval between each by suitably selecting the lengths of their respective passages so that each mechanism is actuated while the workpiece is secured by a strong holding force. Specifically, when the workpiece 105 is clamped by presser member 130 and receiving block 124, projections 145, 146 bite into the workpiece and other peripheral parts of the workpiece wherein said projections have previously bitten are also fastened by said presser member 130 and receiving block 124, and when a large compressive force is applied to the workpiece in its axial direction, the workpiece is instantaneously sheared by the force of the movable tool 103 and is cleanly cut thereby. During this operation, a reduction in shearing resistance is effected by the high speed shearing hence yielding excellent cutting performance. Such improved cutting performance is provided by a combination of compression and shearing force, and hence it is possible to obtain a smooth and crack-free cut plane. The cut pieces of the material are rolled out of the machine through a discharge port 175 suitably provided in the base block 127. As the cutting is completed, pneumatic pressure is used to displace the movable tool 103, workpiece presser member 130 and compressing piston hammers 116, 116', 116'', in a reverse order to the above-said operation, by applying pressure through the respective passages 118 and operating bars 129, 135 from the compressed air source 121 to thereby let said operative members return to their respective withdrawn positions, thus completing one cycle of the cutting operation.

Although in the above embodiment the semi-circular projections are arranged such that the depth of bite increases as workpiece is gradually fed into the mechanism, the number and configuration of such projections can be selected in any manner that is consistent with the holding force of the projections. Also, in the present embodiment, these projections are so arranged that those positioned frontward are taller in height than those positioned rearward, but such an arrangement is not always necessary. For instance, it is possible to utilize any arrangement that allows the projections to successively bite deeper into the workpiece as the workpiece is advanced. The cutting mechanism is preferably arranged such that the upper and lower cutting edges, either movable or fixed, are vertically opposed to each other along a horizontal plane defined by the axis of the workpiece, with their configurations being preferably selected to correspond with the shape of the workpiece to be cut.

Thus, according to the present invention, several stepped piston hammers arranged end to end with a suitable space therebetween are operated by impact liquid pressure to effect a percussion of the workpiece in an axial direction at suitable time intervals, such percussions being repeated several times in succession, whereby unlike in the conventional cutting practices where cutting is performed merely by the dint of shearing force while keeping one end of the workpiece free, it is possible to carry out an improved and effective shearing to thereby produce a smooth cut plane free of dullness, burrs or cracks, and to obtain worked materials which are uniform in size and weight.

Furthermore, in accordance with the instant invention, since every part of the workpiece to be cut is bitten by the projections having a suitable configuration and provided at every distance corresponding to the cut length of the workpiece from its cutting end, the sectional area to be cut is diminished and such diminished area is subjected to high speed shearing, so that the resultant cut plane is smooth and has no dullness, burrs or cracks, and also the size and weight of the cut pieces are uniform. Still further, as said projections bite into the workpiece when the latter is held by the receiving block and presser member, the holding force in the axial direction is reinforced to provide a force opposite to the percussive compression force exerted against the workpiece in its axial direction, allowing the developed compound stress to be more effectively applied to the workpiece. Additionally, the mechanical construction of the apparatus is simple and easy to operate, with trouble free operation assured as well as a very smooth and effective shearing with reduced power consumption. Thus, the present invention makes it possible to carry out extremely economical and efficient high-speed shearing to obtain blank materials which are uniform in weight and size and whose sheared planes are completely free of dullness, burrs or cracks.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A material cutting device comprising a movable tool having a cutting edge for cutting a workpiece, a holding mechanism for holding the workpiece in position, and a compression means adapted to exert impact force on said workpiece in an axial direction to facilitate high speed cutting of the workpiece, said compression means including at least two piston hammers arranged coaxially with a workpiece in end to end relation to each other with a suitable space therebetween, and means for sequentially displacing said hammers into percussive contact with each other and said workpiece to effect an axial compression of said workpiece whereby the coincident operation of said cutting edge and compression means facilitates the shearing of said workpiece.

2. A material cutting device as claimed in claim 1, wherein said hammer sequential displacement means includes a block, cylinders in said block for slidably receiving said piston hammers, and means for developing a pressure in said cylinders, said pressure displacing said piston hammers toward said workpiece.

3. A material cutting device as claimed in claim 2, wherein said pressure developing means is coupled to said cylindrical cavities and is further coupled to said movable cutting tool, said pressure means displacing said cutting edge into contact with a workpiece coincident with the application of said pressure to said cavities to effect the shearing of said workpiece.

4. A material cutting device as claimed in claim 3, wherein each said piston hammer annular carrying cavity away from said workpiece has a length in its axial direction of twice that of the annular cavity supporting said hammer proximate to the workpiece, to achieve a percussive effect.

5. A material cutting device as claimed in claim 1, including a cutting mechanism including said movable tool and a fixed receiving block disposed in vertical opposition to said cutting edge tool so as to cut the workpiece disposed therebetween.

6. A material cutting device as claimed in claim 5, wherein impact liquid pressure passages are disposed in said compression means and said cutting mechanism and each of said passages is connected to an impact liquid pressure generating means so that the exertion of a compression force and a displacement of said movable tool can be coincidently effected by said impact liquid pressure generating means.

7. A material cutting device as claimed in claim 5, wherein said workpiece holding mechanism is positioned in close adjacency to said cutting mechanism, said holding mechanism comprising a slidable presser member disposed in opposition to said workpiece receiving block and including projections adapted to bite into the workpiece to form notches therein, said projections being provided at intervals corresponding to the length of the workpiece to be cut, whereby during cutting of the workpiece, said workpiece is securely held in position by said holding mechanism including said projections, and high speed shearing is effected by the cutting edge of said movable tool at the notches in the workpiece formed by said projections as said compressive force is applied.

8. A material cutting device as claimed in claim 6, wherein projections are provided on the opposed faces of said presser member and receiving blocks, said projections being projected at a certain predetermined inclination and at heights which are successively longer toward said cutting member.

9. A material cutting device as claimed in claim 8, wherein an impact liquid pressure passages are provided in said compression means, said cutting mechanism and said holding mechanism, each of said passages being coupled to an impact liquid pressure generating means, so that compressing, holding and cutting of the workpiece can be coincidently effected.

10. A material cutting device as claimed in claim 9, wherein the liquid pressure passages of said workpiece holding mechanism, said compression means and said cutting mechanism are of different lengths to that said liquid pressure will cause such mechanisms to be successively operated in a certain order with a slight time lag relative to each other due to the lengths of said passages.

* * * * *